G. P. BRIAU.
COMBINED SUCTION AND FORCE PUMP.
APPLICATION FILED JAN. 23, 1915.
1,170,139.
Patented Feb. 1, 1916.
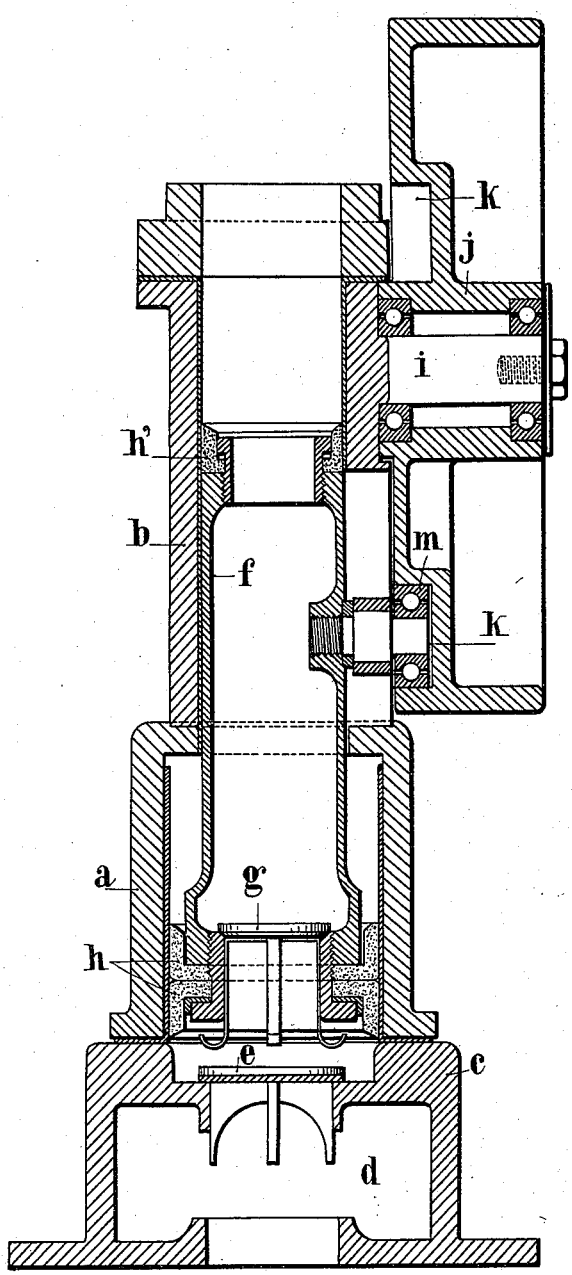
WITNESSES:
INVENTOR
Gabriel Pierre Briau
BY
ATTORNEY

UNITED STATES PATENT OFFICE.

GABRIEL PIERRE BRIAU, OF TOURS, FRANCE, ASSIGNOR TO LA SOCIÉTÉ DITE G. BRIAU ET A. SOUDÉE, OF TOURS, FRANCE.

COMBINED SUCTION AND FORCE PUMP.

1,170,139.

Specification of Letters Patent.

Patented Feb. 1, 1916.

Application filed January 23, 1915. Serial No. 3,961.

*To all whom it may concern:*

Be it known that I, GABRIEL PIERRE BRIAU, a citizen of the Republic of France, and resident of Tours, France, (post-office address 64 Rue des Halles, Tours,) have invented a new and useful Combined Suction and Force Pump, which pump is fully set forth in the following specification.

This invention relates to a double-acting suction and force pump having a differential tubular piston.

The pump forming the subject of the invention, is illustrated by way of example in the accompanying drawing, the single figure of which is a view in cross-section.

The body of the pump comprises two parts $a$ and $b$, the part $a$ having an inner cross-section twice that of the inner cross-section of the part $b$. This pump body which however could also be in one piece or in several pieces rests on a base $c$ forming at $d$ the suction chamber, at the upper portion of which is arranged the suction valve $e$. The piston $f$ which is hollow, is provided at its lower end with the discharge valve $g$ and at each of its ends with packings $h$ and $h'$ insuring tight joints (hydraulic leathers, hemp cords, metal rings and etc.)

During its up-stroke, the piston $f$, the lower end of which has a diameter approximately double that of its upper end, draws a body of liquid of given volume into the body $a$, and simultaneously discharges through its upper end a body of half that volume; during the down stroke, a body of liquid, still equal in volume to half that drawn in during the up-stroke, is discharged, while the entire body of liquid contained in the part $a$ of the pump body penetrates into the interior of the piston $f$ through the discharge valve $g$, and so on. The pump is therefore a suction pump during the rising of the piston, and a force pump during the rising as well as during the descent. This arrangement enables the piston to be driven at a high speed, since the liquid has a continuous motion and follows a rectilinear path and consequently is not exposed to losses of head which, in ordinary pumps, are produced, on the one hand, by excessively long travels in narrow passages, and on the other hand, by changes of direction of the liquid mass due to sinuosities of the said travels. It is therefore possible to drive the pump, with the greatest ease, by motors having a high speed of rotation (electric motors, explosion or other engines) and to obtain a very high output with apparatus of reduced weight and dimensions.

The means for driving the piston $f$ may be any desired, for instance it could be constituted by a sleeve concentric with the upper body of the pump and driven by a connecting rod and crank or by an eccentric, or by a bifurcated connecting rod, and the piston could be in all cases driven by hand or by power.

The accompanying drawing shows by way of example a particularly advantageous system of driving for high speed work.

This system is as follows: With the body $b$ is made in one piece, or secured to it by any desired means, the spindle or pin $i$ of a pulley $j$ provided with a groove $k$ made suitably eccentric relatively to the axis of rotation of the pulley and forming the track for a roller $m$ mounted on a pin secured to the piston $f$.

The characteristic arrangements of the pump described in the foregoing, which extend of course to a horizontal pump, render it more particularly suitable for delicate liquids, such as milk, wine etc. that have to be transferred from one vessel to another without being stirred up; such a pump could also be used with advantage as a compressor for air or any other gases.

Claims:

1. A double-acting suction and force pump, consisting of a case or body comprising two parts having different diameters, the part of reduced diameter being provided with a vertical slot; a differential, tubular piston movable in said case; a spindle secured laterally to the reduced part of said piston and projecting through said slot; a roller mounted on the projecting portion of said spindle; and a driving pulley having a track for said roller.

2. A pump consisting of a case or body provided with a vertical slot; a piston movable in said case; a spindle secured laterally to said piston and projecting through said slot; a roller mounted on the projecting portion of said spindle; and a driving pulley having a track for said roller.

In testimony whereof I have signed this specification in the presence of two subscribing witnesses.

GABRIEL PIERRE BRIAU.

Witnesses:
E. K. EPPERSTEIN,
VERGE.